United States Patent [19]
McCord, Jr.

[11] 3,946,774
[45] Mar. 30, 1976

[54] DEVICE FOR EMPLOYING A MOTORIZED HAND TOOL TO CUT A SPIRALLED GROOVE IN A WORKPIECE

[75] Inventor: Wilfred M. McCord, Jr., Louisville, Ky.

[73] Assignee: Vermont American Corporation, Louisville, Ky.

[22] Filed: Oct. 17, 1974

[21] Appl. No.: 515,475

[52] U.S. Cl. .................. 142/26; 82/5; 90/11.62; 144/136 R
[51] Int. Cl.² .................. B23B 5/46; B27C 5/10
[58] Field of Search .................. 142/26, 23–25, 142/33–35, 1; 144/136 R, 136 C; 90/11.62, 11.64; 82/5

[56] References Cited
UNITED STATES PATENTS

| | | | |
|---|---|---|---|
| 1,649,588 | 11/1927 | Hamblen | 142/26 |
| 2,210,737 | 8/1940 | Trebert | 142/26 |
| 2,378,302 | 6/1945 | Kline | 90/11.62 |
| 2,702,569 | 2/1955 | Yelle | 144/136 C |
| 3,438,412 | 4/1969 | Zeigler | 144/136 R |

*Primary Examiner*—Leonidas Vlachos
*Attorney, Agent, or Firm*—Harry B. O'Donnell, III

[57] ABSTRACT

This invention provides a device for employing a motorized hand tool, such as a portable router and the like, to cut a spiralled groove in a workpiece, such as a leg for a table, chair, and the like. Basically, the device comprises: frame means including end block means rotatably journalling chuck means for holding the workpiece for rotation around an axis and guide means interconnected to the end block means for guiding the motorized hand tool for movement with respect thereto in a direction generally parallel to the axis; and drive means mounted on the frame means and being interconnectable between the motorized hand tool and the chuck means to cause movement of the motorized hand tool in a direction generally parallel to the axis in response to rotary movement of the workpiece around the axis.

4 Claims, 13 Drawing Figures

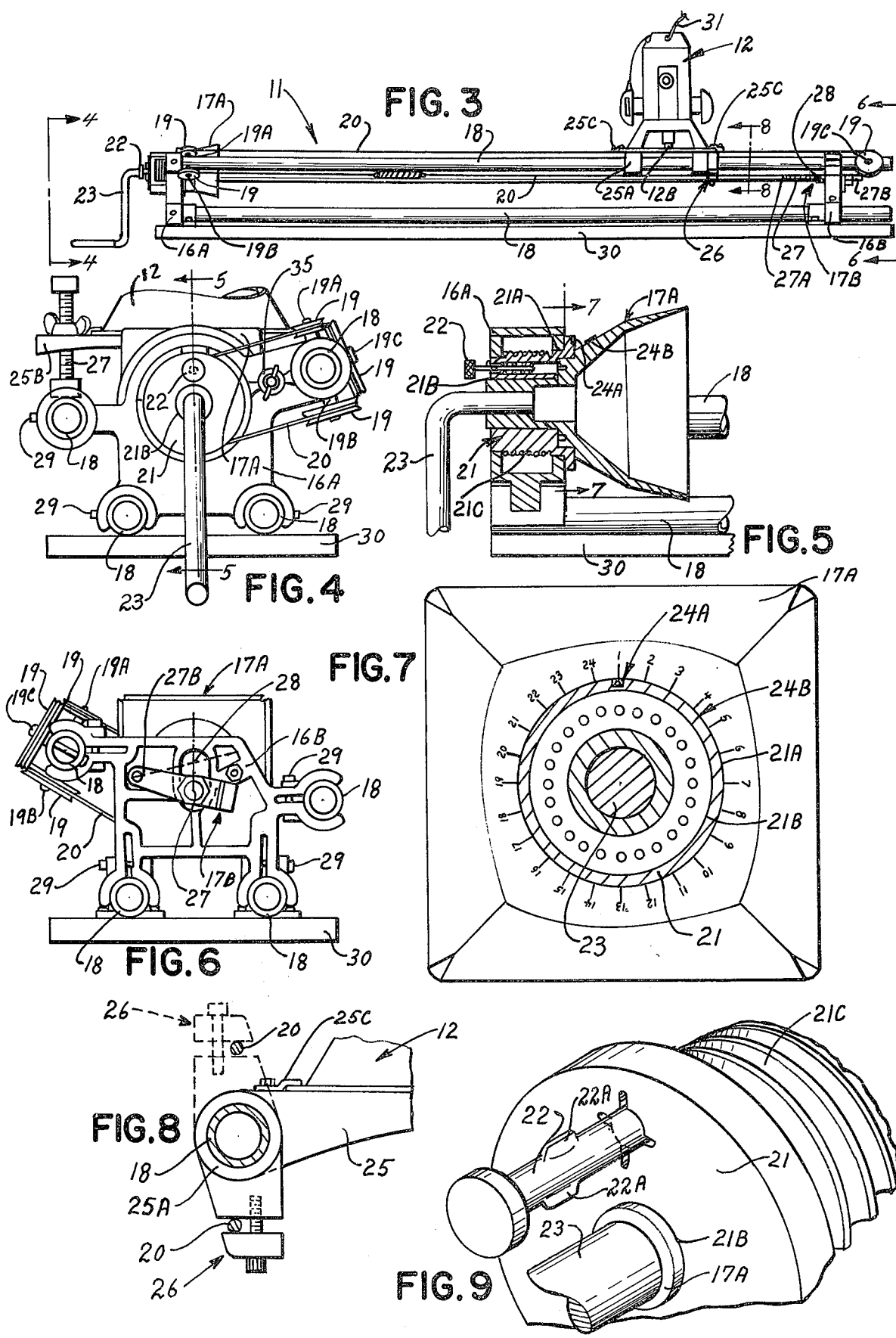

DEVICE FOR EMPLOYING A MOTORIZED HAND TOOL TO CUT A SPIRALLED GROOVE IN A WORKPIECE

BACKGROUND OF THE INVENTION

This invention relates to means for cutting one or more grooves in a workpiece and, more particularly to a device for employing a motorized hand tool, such as a portable router and the like, to cut one or more spiralled grooves in a workpiece, such as a leg for a table, chair, and the like.

In the past, various means have been provided for cutting one or more grooves in a workpiece, such as a leg for a table, chair, and the like, as a decoration thereof. This grooving, which is commonly known as "roping", "fluting", and the like, was originally achieved hundreds of years ago by hand carving. In later years, large, cumbersome, complex, and expensive machines were built for mechanization and mass-production. These old machines were similar to what are presently commonly known in the metal working industry as, "universal milling machines". Naturally, because of their great expense and complexity of construction and operation, ownership and operation of these old machines by small, individual, "home" craftsmen have been highly impractical and rare. And, "job shops", owning these old and expensive machines, which are willing to economically perform this decorative grooving function for small, individual, home craftsmen, have now almost become extinct.

There are presently several million motorized hand tools, such as portable routers, owned by small, individual, home craftsmen. And, in accordance with the present invention, there is provided a device, which is simple both in construction and operation and, consequently, inexpensive in cost of acquisition, when compared to the aforedescribed complex old machines, that permits the employment by a small, individual, home craftsman of a motorized hand tool, such as a portable router and the like, to cut one or more spiralled grooves in a workpiece, such as a leg for a table, chair, and the like.

SUMMARY OF THE INVENTION

The present invention provides a device for employing a motorized hand tool, such as a portable router and the like, to cut a spiralled groove in a workpiece, such as a leg for a table, chair, and the like. Basically the device of the present invention comprises: frame means including end block means rotatably journalling chuck means for holding the workpiece for rotation around an axis and guide means interconnected to the end block means for guiding the motorized hand tool for movement with respect thereto in a direction generally parallel to the axis; and drive means mounted on the frame means and being interconnectable between the motorized hand tool and the chuck means to cause movement of the motorized hand tool in a direction generally parallel to the axis in response to rotary movement of the workpiece around the axis.

Preferably, the guide means includes: guide rod means interconnected to the end block means; and follower means, on which the motorized hand tool can be carried, that are mounted on the guide rod means for movement with respect thereto and are interconnectable to the motorized hand tool. It is further desirable that first adjustment means be provided on the follower means for selectively adjusting the radial spacing between the motorized hand tool carried thereby and the axis to thus selectively adjust the depth of the spiral groove that is to be cut in the workpiece by the motorized hand tool, and that second adjustment means be provided on the chuck means for selectively adjusting circumferential spacing around the axis between individual ones of a plurality of spiral grooves which are to be cut in the workpiece. And, the drive means preferably comprises: pulley means rotatably mounted on the frame means; endless cable means tightly mounted around the pulley means and the rotatable chuck means; and fastener means for readily detachably connecting the motorized hand tool to the endless cable means.

BRIEF DESCRIPTION OF THE DRAWING

The present invention is illustrated in the accompanying drawings, wherein:

FIG. 3 is a rear elevational view of the form of the novel device of the present invention shown in FIG. 2;

FIG. 4 is a somewhat enlarged fragmentary view taken along line 4—4 of FIG. 3;

FIG. 5 is a fragmentary sectional view taken along line 5—5 of FIG. 4;

FIG. 6 is a somewhat enlarged fragmentary view taken along line 6—6 of FIG. 3;

FIG. 7 is a somewhat enlarged sectional view taken along line 7—7 of FIG. 5;

FIG. 8 is a somewhat enlarged sectional view taken along line 8—8 of FIG. 3; and FIG. 9 is a greatly enlarged fragmentary perspective view illustrating a construction detail of the adjustable chuck means of the illustrated form of the novel device of the present invention.

DETAILED DESCRIPTION

Figure 1A:
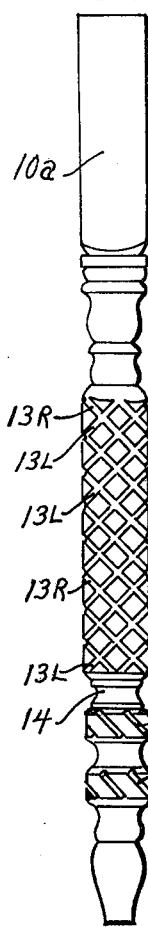
FIGS. 1A–1E are vertical side elevational views of several typical items, five table legs, as shown, which can be produced by utilizing a presently preferred form of the novel device that is provided in accordance with the present invention to employ a motorized hand tool, such as a portable router, to cut one or more grooves in a workpiece.
Figure 1B:
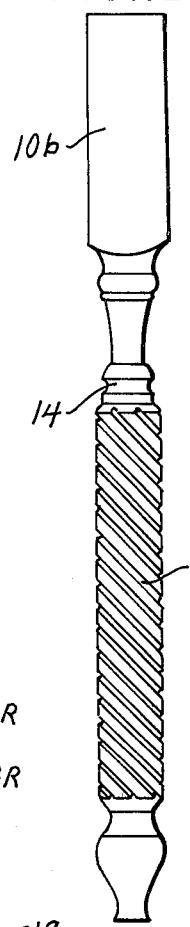
Figure 1C:
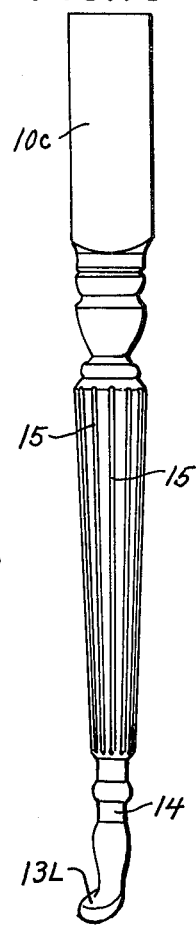
Figure 1D:
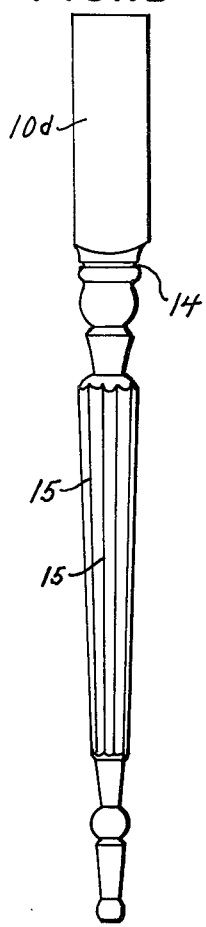
Figure 1E:
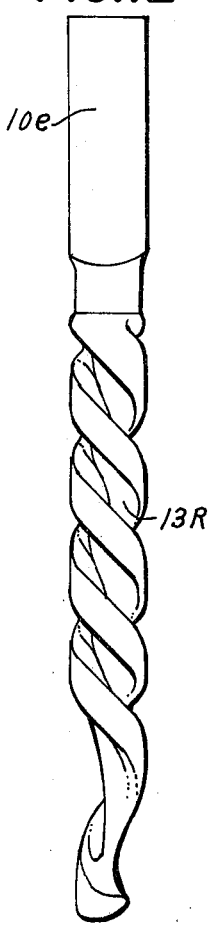
Figure 2:
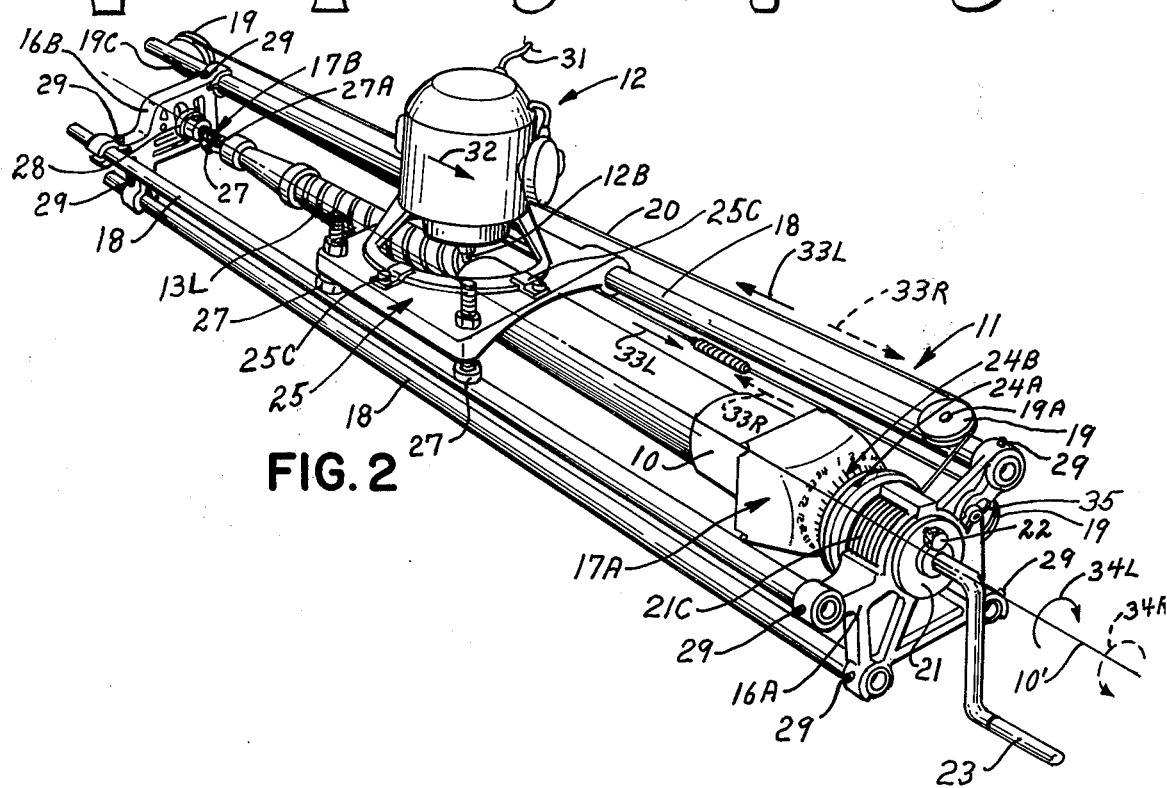
FIG. 2 is a somewhat schematic front perspective view illustrating a presently preferred form of the novel device of the present invention employing motorized hand tool, a portable router as shown, to cut a spiralled groove in a workpiece that is mounted in the device's chuck means.

Turning now to the drawings, and more particularly to FIGS. 1A–1E thereof, there are illustrated vertical side elevational views of several typical items, five table legs 10a–10e as shown, that can be produced by a home craftsman utilizing a presently preferred form of a novel device 11 which is provided in accordance with the present invention, such as that shown in FIGS. 2–9, to employ a motorized hand tool 12, such as the illustrated portable router, or the like, to cut one or more grooves in a workpiece 10, such as the wooden block shown in FIG. 2.

As illustrated in FIGS. 1A–1E and 2, the novel device 11 of the present invention can be utilized with the motorized hand tool 12 to cut into the outer periphery of the workpiece 10 both left-hand and right-hand spiralled grooves or "ropes" 13L and 13R, as well as circular grooves or "rings" 14 and axial grooves or "flutes" 15, with respect to its major axis 10'.

Basically, as shown in FIGS. 2–9, the novel device 11 of the present invention comprises: frame means including end block means, such as the illustrated two generally vertically arranged and horizontally spaced apart end blocks 16A and 16B which respectively journal first and second chuck means 17A and 17B for holding a workpiece, for rotation about an axis, such as the major axis 10' of the illustrated workpiece 10, and guide means, such as the illustrated generally horizontally arranged guide rods 18, that are interconnected to and span the space between the two end blocks 16A and 16B for guiding a motorized hand tool, such as the illustrated portable router 12 or the like, for movement with respect to the frame means in a direction generally parallel to the workpiece axis 10'; and drive means, such as the illustrated pulley 19 and surrounding endless cable means 20, mounted on the frame means and being optionally interconnectable between the motorized hand tool 12 and the chuck means 17A to cause movement of the motorized hand tool 12 in a direction generally parallel to its major axis 10' in response to rotary movement of the workpiece 10 mounted therein generally around that axis 10'.

In the illustrated form of the novel device 11 of the present invention, the first chuck means 17A which is rotatably journalled in a first one 16A of the two frame means end blocks 16A and 16B is adapted to receive and partially surround one end of the workpiece 10 (the upper end as illustrated in FIGS. 1A–1E and 2), while the second chuck means, which is rotatably journalled in the other one 16B of the two frame means end blocks 16A and 16B is adapted to engage the opposite end of the workpiece 10.

As shown in detail in FIGS. 2–5, 7 and 9, the first chuck means 17A is rotatably journalled in the first end block 16A by bearing means 21 having a first bearing surface 21A mounted in the first end block 16A for rotation with respect thereto generally about the major axis 10' of the workpiece 10 and a second surface 21B which rotatably mounts the first chuck means 17A for possible rotation relative to that second bearing surface 21B and, of course, the bearing means 21, about that same axis 10'. Retractable locking pin means 22 are mounted on the bearing means 21 that are movable between an inserted first position (FIGS. 2–5) interlocking the bearing means 21 and the first chuck means 17A for united rotation together with respect to the frame means first end block 16A generally around the major axis 10' of the workpiece 10 and a retracted second position (FIG. 9) permitting relative movement between the first chuck means 17A and the bearing means 21 around the same axis 10'. And, handle means 23 are mounted on the first chuck means 17A for initiating relative rotary movement between the first chuck means 17A and the bearing means 21 when the retractable locking pin means 22 is in its retracted second position (FIG. 9), with indicator means 24A and 24B, as best shown in FIGS. 2 and 7, being respectively carried by the bearing means 21 and the first chuck means 17A to indicate the amount of any such relative rotary movement between the first chuck means 17A and the bearing means 21.

As also shown in FIGS. 2–9, the bearing means 21 for the first chuck means 17A has another outer surface 21C that is grooved to tightly receive the endless cable 20, which is, in turn, tightly mounted around the pulleys 19 of the drive means, such that, when the retractable pin means 22 is located in its inserted first position (FIGS. 2–5) movement of the endless cable 20 will cause united rotation of the then interlocked bearing means 21 and first chuck means 17A with respect to the frame means first end block 16A around the major axis 10' of the workpiece 10. As further illustrated, two of the drive means pulleys 19 are rotatably journalled on axles 19A and 19B provided on one of the guide rods 18 adjacent to its point of connection to the first one 16A of the frame means end blocks 16A and 16B while a third such pulley is rotatably journalled on another axle 19C that is mounted on the same guide rod 18 adjacent to its point of connection to the other one 16B of these two end blocks 16A and 16B.

As further illustrated, the guide means of the novel device 11 of the present invention also preferably further includes follower means 25, such as the bracket best shown in FIGS. 2–4 and 8, that has one of its ends 25A loosely journalled on an uppermost one of the guide rods 18 for free movement relative thereto and upon which the motorized hand tool 12 can be readily engaged and disengaged, as by the illustrated screw clamps 25C, for carriage of it by the follower means 25 with its cutting means, such as the illustrated router bit 12B, aligned over the major axis 10' of the workpiece 10.

As still further shown in FIGS. 3 and 8, other screw clamp means 26 are provided adjacent this one end 25A of the follower means bracket 25 for optionally readily attaching and detaching it and, consequently the motorized hand tool 12 carried by it, to the endless cable 20 of the drive means in either a first position (as shown in solid lines in FIGS. 3 and 8) or a second position (as shown in shadow lines in FIG. 8). And, the end 25B of the follower means bracket 25 opposite the journalled one end 25A thereof is preferably movably supported atop another one of the guide rods 18 by adjustable means, such as the illustrated pair of cushioned bolts 27 threaded therethrough which can be manually operated to adjust the spacing between the cutting means 12B of the motorized hand tool 12 and the major axis 10' of the workpiece 10 to thus selectively adjust the depth of the groove 13L, 13R, 14 or 15 which is to be cut thereby into the outer periphery of the workpiece 10.

As best shown in FIGS. 2, 3 and 6, the second chuck means 17B which is rotatably journalled in the second end block 16B of the frame means need not be directly connectable to the endless cable 20 and pulleys 19 of the drive means, as is the case with the first chuck means 17A. In the illustrated form of the novel device 11 of the present invention, the second chuck means 17B merely comprises a screw 27 that is threaded into swiveled bearing means 28 that are mounted in the frame means second end block 16B for both rotation and swivel movement relative thereto generally around the major axis 10' of the workpiece 10. As shown in FIGS. 2, 3 and 6, one end 27A of the second chuck means screw 27 is adapted to be tightly engaged with the end of the workpiece 10 opposite that which is engaged within the first chuck means 17A, while the opposite end of the second chuck means screw 27 is provided with second handle means 27B for threading the screw 27 through the second bearing means 28 to move its first end 27A into and out of tight engagement with the end of the workpiece 10 opposite that which is engaged within the first chuck means 17A.

The aforedescribed arrangement of the second chuck means 17B permits the use of the novel device 11 of the present invention with workpieces 10 of a fairly wide variety of lengths. However, it is further desirable that the aforedescribed interconnections of both the first and second end blocks 16A and 16B to the guide rods 18 be made with readily attachable and detachable means such as the illustrated screws 29 to thus permit more gross adjustment of the spacing between the first and second chuck means 17A and 17B which are respectively mounted therein. This latter feature is also beneficial to both storage and packaging of the novel device 11 of the present invention.

To utilize the illustrated form of the novel device 11 of the present invention, an operator first erects its frame means by interconnecting the two end blocks 16A and 16B thereof to the guide rods 18 with the screws 29 provided for that purpose, as best shown in FIGS. 2 and 3, with the open end of the first chuck means 17A that is to receive one end of the workpiece 10 (the top end as shown in FIGS. 1A–1E and 2) facing the end 27A of the screw 27 of the second chuck means 17B that is to be tightly engaged with the opposite end of the workpiece 10. At this time, the operator sets the gross spacing between the two end blocks 16A and 16B to broadly accommodate the average lengths of the workpiece 10 upon which the device 11 is to be employed. The thus erected frame means of the device is preferably located upon a workbench 30 as shown in FIGS. 3–6.

Next, the operator selects the particular workpiece 10 that is to be grooved and chucks it up in the now erected frame means of the novel device 11 of the present invention, as best shown in FIG. 2 by first inserting one of its ends (the upper end as shown in FIGS. 1A–1E) into the open end of the first chuck means 17A and then rotating the second handle means 27B of the screw 27 of the second chuck means 17B to tightly engage its end 27A with the opposite end (the bottom end as shown in FIGS. 1A–1E) of the workpiece 10 and thus align the workpiece 10 for rotation with respect to the frame means of the device 11 generally around the major axis 10' of the workpiece 10.

Then, the operator tightly mounts the drive means endless cable 20 around its pulleys 19 and the grooved outer surface 21C of the bearing means 21 for the first chuck means 17A.

Next, the operator connects the desired cutter means, such as the illustrated router bit 12B, to the power chuck of the motorized hand tool 12 in a well-known manner and mounts the motorized hand tool 12 on the follower means bracket 25, tightly attaching it thereto, as best shown in FIG. 2, with the screw clamps 25C provided for that purpose with its cutting means 12B aligned generally over the major axis 10' of the chucked up workpiece 10.

Then, assuming the operator wants to cut a left-hand spiralled groove, such as the left-hand spiralled groove 13L illustrated in FIGS. 1A, 1C, and 2 of the drawing, in the periphery of the chucked up workpiece 10, the operator then performs the following additional steps:

A. Next, the operator manually moves the motorized hand tool 12 and the follower means bracket 25 to which it is attached along the guide rod 18 to which the one end 25A of the follower means bracket 25 is loosely journalled to a point on the frame means of the device 11 aligning the cutting means 12B of the motorized hand tool 12 over the spot along the length of the periphery of the chucked up workpiece 10 where the operator desires the one end of the left-hand groove 13L to commence;

B. Then, the operator moves the retractable locking pin means 22 of the first chuck means 17A to its retracted second position (FIG. 9) and operates the handle means 23 of the first chuck means 17A to align the indicator means 24A and 24B at a first set position, preferably with the indicator means pointer 24A aligned with the "number 1 position" of the dial of the indicator means 24B, and then returns the retractable locking pin means 22 to its inserted first position (FIGS. 2–5) again interlocking the bearing means 21 and the first chuck means 17A for united rotation together with respect to the frame means first end block 16A generally around the major axis 10' of the chucked up workpiece 10;

C. Next, the operator threads and sets the cushioned bolts 27 at the other end 25B of the follower means bracket 25 to selectively adjust the radial spacing between the cutting means 12B of the motorized hand tool 12 and the major axis 10' of the chucked up workpiece 10 so as to give the desired cutting depth of the groove 13L that is to be cut in the periphery of the workpiece 10;

D. Then, the operator interconnects the motorized hand tool 12 and the follower means bracket 25 to which it is attached to the drive means by clamping the screw clamp means 26 at the end 25A of the follower means bracket 25 onto the endless cable 20 of the drive means in its first position (as shown in solid lines in FIGS. 3 and 8);

E. Next, the operator energizes the motorized hand tool 12 in a well-known manner as by connecting its partly illustrated electric power supply cord 31 to an electric power source (not shown), thus initiating rotation of its cutting means 12B; and F. Then, the operator manually rotates the handle means 23 of the first chuck means 17A in the direction shown by solid line arrow 34L in FIG. 2, thus imparting movement to the endless cable 20 of the drive means, as shown by the solid line arrows 33L in FIG. 2, and thereby causing movement of the motorized hand tool 12 and the follower means bracket 25 to which it is attached (towards the first chuck means 17A as shown by arrow 32 in FIG. 2) in a direction generally parallel to the major axis 10' of the chucked up workpiece 10 by slideably pulling the journalled end 25A of the follower means bracket 25 linearly along its guide rod 18 while also causing simultaneous rotary movement (as shown by the solid line arrow 34L in FIG. 2) of the chuck means 17A and 17B and the workpiece 10 chucked up therein about that same axis 10' with respect to the end blocks 16A and 16B of the novel device 11 of the present invention to thus produce, in combination with the action of the cutting means 12B of the motorized hand tool 12, the left-hand spiral groove 13L. This step is continued until the desired length of the groove 13L is achieved, whereupon, of course, the motorized hand tool 12 is then deenergized by the operator, as by removing its cord 31 from connection with the unshown power supply.

Should the operator then desire to cut a second left-hand groove 13L in the periphery of the chucked up workpiece 10, he then manually returns the motorized hand tool 12 and the follower means bracket 25 to which it is attached to the starting point of the just cut left-hand spiral groove 13L by sliding the journalled end 25A of the bracket linearly with respect to its guide rod 18. Then, the operator moves the retractable locking pin means 22 of the first chuck means 17A to its retracted second position (FIG. 9) and operates the handle means 23 of the first chuck means to align the indicator means 24A and 24B at a second set position, such as with the indicator means pointer 24A aligned with the "number 4 position" of the dial of the indicator means 24B, thereby selectively adjustably setting the circumferential spacing between the second left-hand spiral groove 13L and the one just previously cut as described above with respect to the major axis 10' of the chucked up workpiece 10, and then returns the retractable locking pin means 22 to its inserted first position (FIGS. 2–5) again interlocking the bearing means 21 and the first chuck means 17A for united rotation together with respect to the frame means first end block 16A generally around the major axis 10' of the chucked up workpiece 10. Next, the operator essentially repeats the aforedescribed Steps C–F to complete cutting of this second left-hand spiralled groove 13L in the outer periphery of the workpiece 10. And, he may also, similarly, utilize the novel device 11 of the present invention to cut a third or more left-hand spiralled grooves that are selectively circumferentially spaced apart from one another around the major axis 10' of the chucked up workpiece 10.

The operating procedure for employing the novel device 11 of the present invention to cut one or more right-hand spiralled grooves 13R (FIGS. 1A, 1B and 1E) is substantially the same as that previously described above regarding the left-hand spiralled grooves 13L, except that in the aforedescribed Step D, the operator fastens the motorized hand tool 12 and the follower means 25 to which it is attached to the drive means of the device 11 by clamping the screw clamp means 26 to the end 25A of the follower means bracket 25 onto the endless cable 20 of the drive means in the second position (as shown in shadow lines in FIG. 8). With this alternative right-hand spiralled groove cutting arrangement, manual rotation by the operator of the handle means 23 of the first chuck means 17A in the direction shown by the shadow line arrow 34R in FIG. 2 will impart movement to the drive means endless cable 20 (as shown by the shadow line arrows 33R in FIG. 2) thereby causing movement of the motorized hand tool 12 and the follower means bracket 25 to which it is attached linearly along its guide rod 18 toward the first chuck means 17A, as shown by the arrow 32 in FIG. 2 in a direction generally parallel to the major axis 10' of the chucked up workpiece 10 by slideably pulling the journalled end 25A of the follower means bracket 25 linearly along its guide rod 18 while also causing simultaneous rotary movement (as shown by the shadow line arrow 34R in FIG. 2) of the chuck means 17A and 17B and the chucked up workpiece 10 generally around its major axis 10'.

Should the operator want to employ the novel device 11 of the present invention to cut circular grooves or rings 14 (as shown in FIGS. 1A–1D) into the workpiece 10, no connection is made between the motorized hand tool 12 and the follower means bracket 25 to which it is attached and the endless cable 20 of the drive means. Instead, the de-energized motorized hand tool 12 and the follower means to which it is attached by the screw clamps 25C are manually aligned by the operator by sliding the journalled end 25A of the follower means bracket 25 linearly with respect to its guide rod 18 to a point aligning the cutting means 12B over the spot along the length of the chucked up workpiece 10 where it is desired to cut each such circular groove or ring 14. Next, the operator locates the retractable locking pin means 22 in its retracted second position where it is so retained by its detents 22A (FIG. 9) to permit free relative rotation between the first chuck means 17A and its bearing means 21 generally around the major axis 10' of the workpiece 10 chucked up therein. Then, the operator energizes the motorized hand tool 12 to commence rotation of its cutting means 12B and begins manual rotation of the chucked up workpiece 10 generally around its major axis 10' by manually rotating the handle means 23 of the first chuck means 17A. Preferably, means, such as the clamp 35 illustrated in FIG. 4, are provided for engaging the bearing means 21 to the first end block means 16A to prevent any possible "sympathetic" rotation of the bearing means 21 during this operation.

And, should the operator wish to employ the novel device 11 of the present invention with the motorized hand tool 12 to cut axial grooves or flutes 15 (FIGS. 1C and 1D) in the outer periphery of the chucked up workpiece 10 which are circumferentially spaced apart around the major axis 10' thereof, the operator does not make any connection between the motorized hand tool 12 and the follower means bracket 25 to which it is attached and the endless cable 20 of the drive means.

To cut such axial grooves or flutes 15 in the workpiece 10 with the novel device 11 of the present invention, the operator first manually moves the motorized hand tool 12 and the follower means bracket 25 to which it is attached linearly along the guide rod 18 to which one end 25A of the follower means bracket 25 is loosely journalled to a point on the frame means of the device 11 aligning the cutting means 12B over the spot along the length of the periphery of the chucked up workpiece 10 where the operator desires one end of the first such axial groove or flute 15 to commence. Next, the operator threads and sets the cushioned bolts 27 at the other end 25B of the follower means bracket 25 to selectively adjust the radial spacing between the cutting means 12B of the motorized hand tool 12 and the major axis 10' of the chucked up workpiece 10 so as to give the desired cutting depth of that axial groove 15 which is to be cut into the periphery of the workpiece 10. Then, the operator energizes the motorized hand tool 12 in a well-known manner as by connecting its partly illustrated electric power supply cord 31 to an electric power source (not shown) thus initiating rotation of its cutting means 12B. Next, the operator manually moves the motorized hand tool 12 and the follower means bracket 25 to which it is attached in a direction generally parallel to the major axis 10' of the chucked up workpiece 10 by sliding the journalled end 25A of the follower means bracket 25 linearly along its guide rod 18 and, thus, generally parallel to the major axis 10' of the chucked up workpiece 10. This step is continued until the desired length of the first such axial groove or flute 15 is achieved, whereupon, of course, the motorized hand tool 12 is then de-energized by the operator as by removing its cord 31 from connection with the unshown power supply. When employing the device for this axial grooving or fluting operation, the only rotation of the chucked up workpiece 10 about its major axis 10' that should occur is performed by the operator through rotation of the handle means 23 of the first chuck means 17A so as to employ the retractable locking pin means 22 to selectively adjustably set the desired circumferential spacing around the major axis 10' of the chucked up workpiece 10 between cuttings of the first and subsequent ones of such axial grooves or flutes 15 which may be cut in the periphery of the chucked up workpiece 10 through employment of the novel device 11 of the present invention.

The width of any of the aforedescribed grooves 13L, 13R, 14 or 15 is, of course, determined by the width of the cutting means 12B which is selectively employed by the operator in the powered chuck of the motorized hand tool 12. And, the tapering of certain of the illustrated ones of such grooves is, of course, accomplished through the selected positioning by the operator of the swiveled bearing means 28 which rotatably journals the screw 27 of the second chuck means 17B in the second end block 16B of the frame means of the novel device 11 of the present invention with respect to the major axis 10' of the chucked up workpiece 10.

It should be apparent that while there has been described what is presently considered to be a presently preferred form of the present invention in accordance with the Patent Statutes, changes may be made in the disclosed device without departing from the true spirit and scope of this invention. It is, therefore, intended that the appended claims shall cover such modifications and applications that may not depart from the true spirit and scope of the present invention.

What is claimed is:

1. A device for employing a motorized hand tool, such as a portable router and the like, to cut a spiralled groove in a workpiece, such as a leg for a table, chair, and the like, comprising:
   a. frame means including end block means rotatably journalling chuck means for holding the workpiece for rotation around an axis and guide means interconnected to said end block means guiding bracket means for supporting the motorized hand tool for movement with respect thereto in a direction generally parallel to said axis; and
   b. drive means mounted on said frame means and being interconnectable between said bracket means and said chuck means to cause movement of the motorized hand tool in a direction generally parallel to said axis in response to rotary movement of the workpiece around said axis,
   c. said guide means including guide rod means interconnected to said end block means; and
   d. first adjustment means provided on said bracket means for selectively adjusting radial spacing between the motorized hand tool supported thereby and said axis to thus selectively adjust the depth of a spiralled groove that is to be cut in the workpiece by the motorized hand tool; and
   e. second adjustment means provided on said chuck means for selectively adjusting circumferential spacing around said axis between individual ones of a plurality of spiralled grooves which are to be cut in the workpiece, and
   f. said drive means comprising:
      i. pulley means rotatably mounted on said frame means;
      ii. endless cable means tightly mounted around said pulley means and said rotatable chuck means; and
      iii. fastener means for readily detachably connecting said bracket means to said endless cable means.

2. A device for employing a motorized hand tool, such as a portable router and the like, to cut a spiralled groove in a workpiece, such as a leg for a table, chair, and the like, comprising:
   a. frame means including end block means rotatably journalling chuck means for holding the workpiece for rotation around an axis and guide means interconnected to said end block means guiding bracket means for supporting the motorized hand tool for movement with respect thereto in a direction generally parallel to said axis; and
   b. drive means mounted on said frame means and being interconnectable between said bracket means and said chuck means to cause movement of the motorized hand tool in a direction generally parallel to said axis in response to rotary movement of the workpiece around said axis; and
   c. adjustment means provided on said chuck means for selectively adjusting circumferential spacing around said axis between individual ones of a plurality of spiralled grooves which are to be cut in the workpiece, and
   d. said drive means comprising:
      i. pulley means rotatably mounted on said frame means;
      ii. endless cable means tightly mounted around said pulley means and said rotatable chuck means; and
      iii. fastener means for readily detachably connecting said bracket means to said endless cable means.

3. A device for employing a motorized hand tool, such as a portable router and the like, to cut a spiralled groove in a workpiece, such as a leg for a table, chair, and the like, comprising:
   a. frame means including end block means rotatably journalling chuck means for holding the workpiece for rotation around an axis and guide means interconnected to said end block means guiding bracket means for supporting the motorized hand tool for movement with respect thereto in a direction generally parallel to said axis; and
   b. drive means mounted on said frame means and being interconnectable between said bracket means and said chuck means to cause movement of the motorized hand tool in a direction generally parallel to said axis in response to rotary movement of the workpiece around said axis; and
   c. adjustment means provided on said chuck means for selectively adjusting circumferential spacing around said axis between individual ones of a plurality of spiralled grooves which are to be cut in the workpiece, and
   d. said drive means comprising:
      i. pulley means rotatably mounted on said frame means;
      ii. endless cable means tightly mounted around said pulley means and said rotatable chuck means; and
      iii. fastener means for readily detachably connecting said bracket means to said endless cable means; and
   e. said adjustment means including:
      i. bearing means having a first bearing surface mounted in said end block means for rotation with respect thereto about said axis and a second bearing surface mounting said chuck means;

ii. retractable locking pin means mounted on said bearing means and movable between an inserted first position interlocking said bearing means and said chuck means for rotation together around said axis and a retracted second position permitting relative rotary movement between said chuck means and said bearing means around said axis;

iii. handle means mounted on said chuck means for initiating said relative rotary movement between said chuck means and said bearing means; and iv. indicator means carried by said bearing means and said chuck means to indicate the amount of said relative rotary movement between said chuck means and said bearing means.

4. A device for employing a motorized hand tool, such as a portable router and the like, to cut a spiralled groove in a workpiece, such as a leg for a table, chair, and the like, comprising:

a. frame means including end block means rotatably journalling chuck means for holding the workpiece for rotation around an axis and guide means interconnected to said end block means guiding bracket means for supporting the motorized hand tool for movement with respect thereto in a direction generally parallel to said axis; and b. drive means mounted on said frame means and being interconnectable between said bracket means and said chuck means to cause movement of the motorized hand tool in a direction generally parallel to said axis in response to rotary movement of the workpiece around said axis, c. said drive means comprising:

i. pulley means rotatably mounted on said frame means;

ii. endless cable means tightly mounted around said pulley means and said rotatable chuck means; and iii. fastener means for readily detachably connecting said bracket means to said endless cable means.

* * * * *